United States Patent
Chesnut

(10) Patent No.: US 8,008,933 B2
(45) Date of Patent: Aug. 30, 2011

(54) SYSTEM AND METHOD FOR BASEBAND CALIBRATION

(75) Inventor: Scott Chesnut, Santa Rosa, CA (US)

(73) Assignee: Verigy (Singapore) Pte. Ltd., Singapore (SG)

( * ) Notice: Subject to any disclaimer, the term of this patent is extended or adjusted under 35 U.S.C. 154(b) by 656 days.

(21) Appl. No.: 11/998,909

(22) Filed: Dec. 3, 2007

(65) Prior Publication Data

US 2009/0144009 A1 Jun. 4, 2009

(51) Int. Cl.
*G01R 31/00* (2006.01)
*G01R 35/00* (2006.01)
*G01R 31/02* (2006.01)

(52) U.S. Cl. .............. 324/750.02; 324/601; 324/537

(58) Field of Classification Search .......... 324/601, 324/76.21, 158.1, 750.02, 537; 455/67.11, 455/115.1, 226.1
See application file for complete search history.

(56) References Cited

U.S. PATENT DOCUMENTS

| | | | |
|---|---|---|---|
| 7,774,154 B2 * | 8/2010 | Sato et al. | 702/117 |
| 2007/0026809 A1 * | 2/2007 | Zhang et al. | 455/67.11 |

* cited by examiner

*Primary Examiner* — Amy He
(74) *Attorney, Agent, or Firm* — Holland & Hart, LLP

(57) ABSTRACT

A system includes at least one of a first generator, at least two of a second generator, and a load board. The at least one of a first generator one of receives and transmits analog signals. The at least two of a second generator one of receives and transmits digital signals. The load board is disposed between the first generator and the second generators and electrically coupled therebetween to calibrate parameters relating to communications. The load board includes a direct path for each of the analog signals between the at least one of the first generator and a corresponding number of devices under test and for each of the digital signals between the at least two of the second generator and a corresponding number of devices under test.

9 Claims, 7 Drawing Sheets

SYSTEM AND METHOD FOR BASEBAND CALIBRATION

BACKGROUND

In today's communication, radio frequency (RF) modulation protocols have increased in complexity. Therefore, the process of making the communications more accurate has accordingly become more complex. In the past, the time and effort required to implement the necessary hardware and software to accomplish this extended accuracy has been very large. RF signals which have been down converted to a baseband frequency range have been historically comprised of single complex electrical signals, where complex entails two types of data embedded therein, real and imaginary. These signals have been called IF in nature because they represent data in the intermediate frequency range. A direct conversion of the IF waveform into two separate real signals is becoming the normal practice. These two signals are commonly called the "I" for in phase and the "Q" for in quadrature. "In quadrature" refers to the signal being 90 degrees out of phase. The motivation to convert single, complex IF waveforms into two real waveforms stems from the fact that two digital to analog converters (DAC) operate at twice the speed of a single DAC. These will double the possible data transmission rate of the communication and increase the accuracy of the transmission fidelity. Because of this advantage, single signal, complex IF intermediate stages are disappearing. However, one requirement of I and Q arbitrary waveform generators (AWG) and digitizers (DGT) is that they be highly balanced in phase and magnitude relative to each other. This is a difficult practice, time intensive, and costly to achieve.

Historically, the requirement to achieve balanced I and Q signals has challenged automatic test equipment (ATE) since such a balance is frequency and magnitude dependent. In order to calibrate out the frequency response of the I and Q paths, calibration at each tone frequency must occur. However, it is nearly impossible for a system calibration procedure to calibrate an ATE at all possible frequencies as the number involved is infinite. A more tractable approach is to calibrate at only those frequencies and amplitudes to be used by a given test program performed by the ATE. Conventional systems and software have been upgraded to enable users to accomplish this using a new Application Programming Interface (API), new additions to the analog calibration menu, and a new calibration load board. Nevertheless, efficiency problems still occur, in particular with regard to a number of relays required on the load board.

SUMMARY OF THE INVENTION

The present invention relates to a system that comprises at least one of a first generator, at least two of a second generator, and a load board. The at least one of a first generator one of receives and transmits analog signals. The at least two of a second generator one of receives and transmits digital signals. The load board is disposed between the first generator and the second generators and electrically coupled therebetween to calibrate parameters relating to communications. The load board includes a direct path for each of the analog signals between the at least one of the first generator and a corresponding number of devices under test and for each of the digital signals between the at least two of the second generator and a corresponding number of devices under test.

DESCRIPTION OF THE DRAWINGS

FIG. 5b shows another part of the principle for the baseband calibration of FIG. 5a.

DETAILED DESCRIPTION

Figure 1:
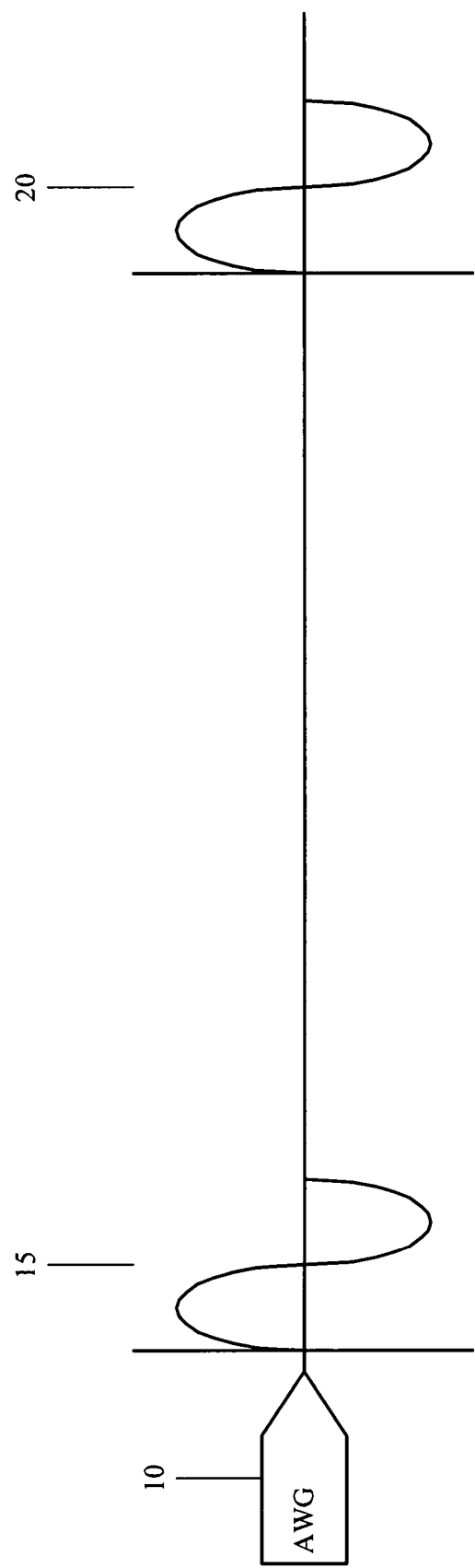
FIG. 1 shows a first path of a baseband frequency wave according to an exemplary embodiment of the present invention.

The exemplary embodiments of the present invention may be further understood with reference to the following description and the appended drawings, wherein like elements are referred to with the same reference numerals. The exemplary embodiments of the present invention provide a system and method for baseband calibration, in particular, relating to I and Q signals of a radio frequency (RF) wave. The exemplary embodiments of the system and method utilize a load board with direct paths that replace a plurality of relays that are conventionally used. Consequently, the efficiency of the calibration is vastly improved. The load board, the calibration, the paths, and the associated method will be described in detail below.

Decreasing the time necessary to implement precisely matched I and Q signals is an endeavor that has been sought since the advent of utilizing baseband waves in communications. The baseband waves may be transmitted using an intermediate frequency (IF). The I and Q signals of the IF may be utilized to increase efficiency of transmitting the signals, thereby increasing the data transmission rate by a factor of two. Those skilled in the art will understand that I/Q modulators have at least twice a bandwidth of IF modulators. The bandwidth of an arbitrary waveform generator (AWG) or analog signal digitizer (DGT) pair relates to a speed that they transmit data. One proposed solution that has been implemented is utilizing multiple converters such as arbitrary waveform generators (AWG) and analog signal digitizers (DGT). When two converters of a multi-channeled instrument (MCB) are used for either converting from analog to digital or from digital to analog, when done precisely and properly, the time necessary to send the same signals from a single converter (i.e., same amount of data) may be halved (i.e., rates are doubled). However, when the two converters are not in phase, not aligned, etc. inaccuracies result. In particular, the inaccuracies may relate to phase and magnitude of the baseband wave when the baseband wave is subjected to a path with active non-linear components. The inaccuracies may create a situation where utilizing a single converter may be equivalent to using two converters. Specifically, data from a first converter or a second converter would have the same rate as having the single converter as data from both converters would not produce the doubled or even greater rate as the single converter.

Furthermore, the calculations and preparations necessary for using multiple converters are immense and a single miscalculation may result in the inaccuracies. I and Q modulators use relative phase and magnitude to encode data. The different frequency responses of I and Q paths introduce significant errors (e.g., inaccuracies). Consequently, the errors in phase and magnitude corrupt the accuracy of measurement. These converters must be calibrated so that the errors are calibrated out. However, system level calibration or characterization of this response is impossible as the number of possible frequencies/filter/gain/load board component settings are infinite. Therefore, the calibration time would take years. The exemplary embodiments of the present invention seek to reduce this time.

FIG. 1 shows a first path of a baseband wave according to an exemplary embodiment of the present invention. The baseband wave is converted into an RF wave by a device under test (DUT). Specifically, the first path relates to the baseband wave with no active components in a transmission path. For example, the first path may be for transmission of the baseband wave through a simple wire. FIG. 1 illustrates how the baseband wave is affected upon transmission from an AWG 10. The baesband wave has initial parameters at an initial waveform 15 where the parameters are for a phase and magnitude. The baseband wave has terminal parameters at a terminal waveform 20.

Because there are no active components in the transmission path, the initial parameters of the initial waveform 15 may be substantially identical to the terminal parameters of the terminal waveform 20. That is, there is a zero phase delay and a zero magnitude change.

Figure 2:
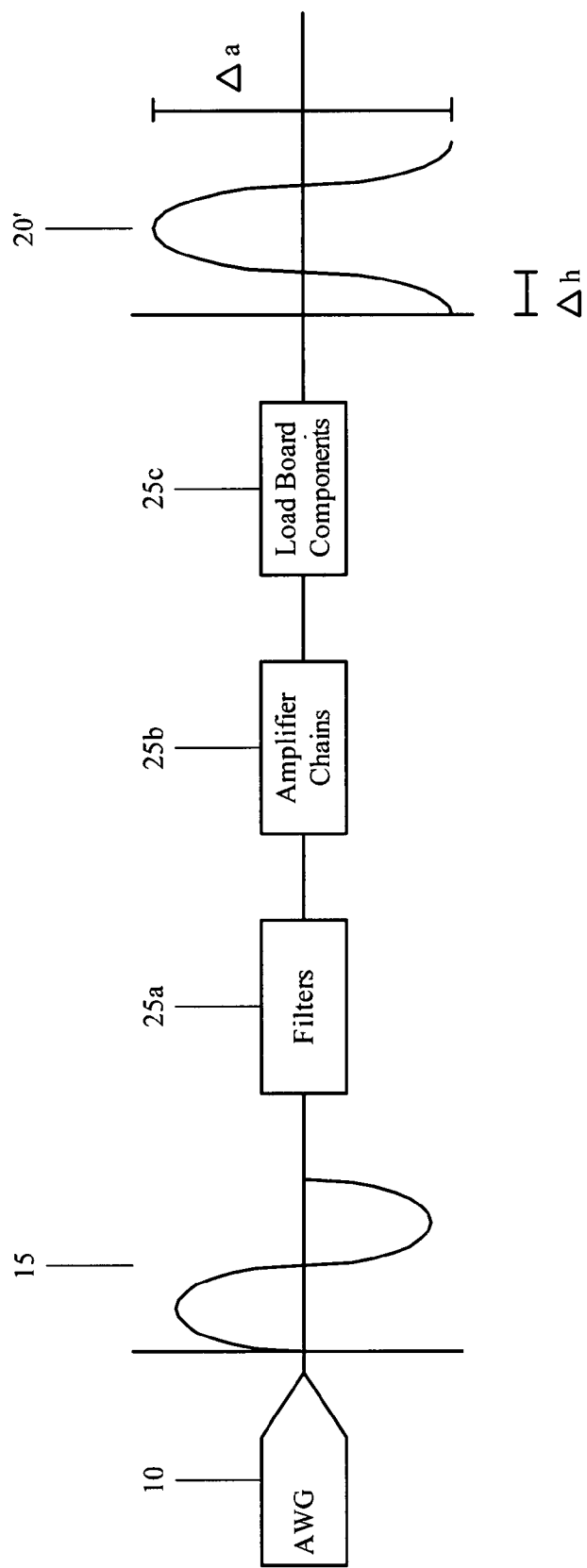
FIG. 2 shows a second path of a baseband frequency wave according to an exemplary embodiment of the present invention.

FIG. 2 shows a second path of a baseband wave according to an exemplary embodiment of the present invention. The baseband wave is converted into an RF wave by a device under test (DUT). Specifically, the second path relates to the baseband wave with active components 25a-c in a transmission path. For example, the second path may be for transmission of the baseband wave through a tester and/or load board. FIG. 2 also illustrates how the baseband wave is affected upon transmission from the AWG 10. The baseband wave has initial parameters at an initial waveform 15 where the parameters are for a phase and magnitude. The baseband wave has terminal parameters at a terminal waveform 20'. Those skilled in the art will understand that non-linear components in the AWG or DGT path create frequency sensitive impulse functions. Consequently, this creates frequency sensitive absolute phase and magnitude offsets.

Because there are active components 25a-c in the transmission path, the initial parameters of the initial waveform 15 may be altered to the terminal parameters of the terminal waveform 20'. The active components may include, for example, filters 25a, amplifier chains 25b, load board components 25c (e.g., buffers), etc. As illustrated in FIG. 2, a phase delay $\Delta h$ may be introduced by the active non-linear components 25a-c. In addition, a magnitude change $\Delta a$ may also be introduced by the active non-linear components 25a-c. If the baseband wave initially resembles a sin wave originating at an origin on Cartesian coordinates (e.g., (0,0)), the baseband wave may be shifted by the phase delay $\Delta h$ in a positive direction on the x-axis while the magnitude change $\Delta a$ may stretch the baseband wave that elongates the wave.

Figure 3:
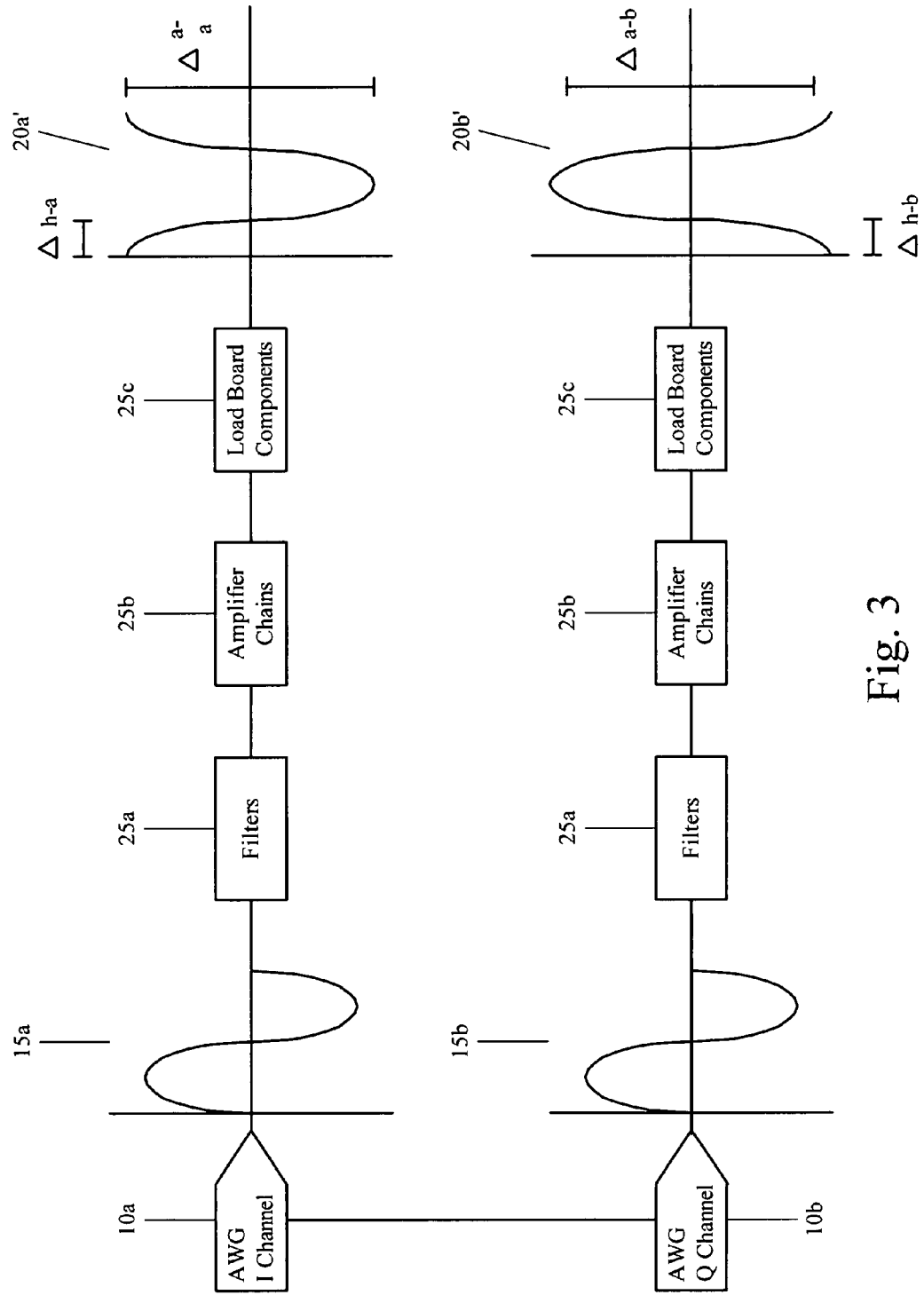
FIG. 3 shows a third path of a baseband frequency wave according to an exemplary embodiment of the present invention.

FIG. 3 shows a third path of a baseband wave according to an exemplary embodiment of the present invention. The baseband wave is converted into an RF wave by a device under test (DUT). Specifically, the third path relates to the baseband wave with active components 25a-c in a transmission path. For example, the third path may be for transmission of the baseband wave through a tester and/or load board. FIG. 3 also illustrates how the baseband wave is affected upon transmission from an AWG 10a-b. The AWG 10a may be for an I channel master while the AWG 10b may be for a Q channel slave. That is, when two AWG or DGT are used for quadrature (I/Q) modulation, the non-linear active components 25a-c of both paths may have different impulse functions. As will be discussed below, frequency sensitive phase and magnitude mismatches may occur even when the AWG or DGT triggering is precise (e.g., ±100 pS). The baseband wave has initial parameters from the AWG 10a at an initial waveform 15a and initial parameters from the AWG 10b at an initial waveform 15b where the parameters are for a phase and magnitude. As illustrated, the initial waveforms 15a-b may be substantially identical. Thus, there may be a negligible phase delay and/or magnitude change between the initial waveforms 15a-b. The baseband wave originating from the AWG 10a has terminal parameters at a terminal waveform 20a' and terminal parameters at a terminal waveform 20b' from the baseband wave originating from the AWG 10b.

Because there are active components 25a-c in the transmission paths originating from the AWG 10a-b, the initial parameters of the initial waveform 15 may be altered to the terminal parameters of the terminal waveform 10a-b. The active components may include, for example, filters 25a, amplifier chains 25b, load board components 25c (e.g., buffers), etc. As illustrated in FIG. 3, with respect to the AWG 10a, a phase delay $\Delta h$-a may be introduced by the active non-linear components 25a-C. In addition, a magnitude change $\Delta a$-a may also be introduced by the active non-linear components 25a-c. With respect to the AWG 10b, a phase delay $\Delta h$-b and a magnitude change $\Delta a$-a may be introduced by the active non-linear components 25a-c. If the baseband wave initially resembles a sin wave originating at an origin on Cartesian coordinates (e.g., (0,0)), the baseband wave may be shifted by the phase delay $\Delta h$-a in a negative direction on the x-axis while the magnitude change $\Delta a$-a may stretch the baseband wave that elongates the wave. The baseband wave may be shifted by the phase delay $\Delta h$-b in a positive direction on the x-axis while the magnitude change $\Delta a$-b may stretch the baseband wave that also elongates the wave but elongating the wave greater than the elongation from the magnitude change $\Delta a$-a.

It should be noted that the above examples described in FIGS. 1-3 utilizing an AWG is only exemplary. The above examples may also refer to the baseband wave originating from a DGT. That is, an analog to digital conversion and a digital to analog conversion may exhibit the same phenomena, errors, shifts, changes, etc. described above.

Figure 4:
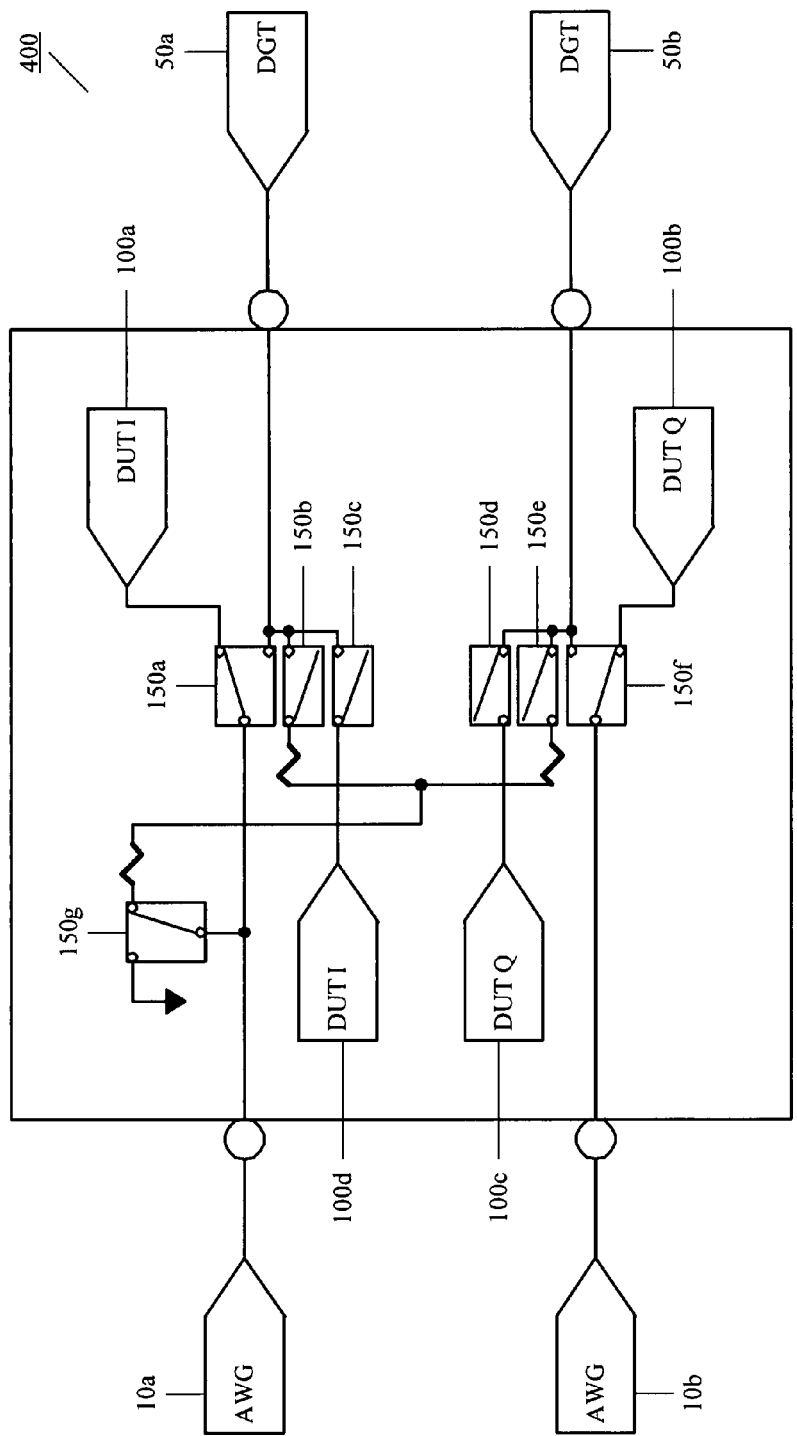
FIG. 4 shows a conventional load board used in baseband calibrations.

FIG. 4 shows a conventional load board 400 used in baseband calibrations of single ended baseband I and Q signals. The conventional load board 400 may be for an analog to digital signal conversion or vice versa. Thus, to calibrate the RF signals in the conversion, the conventional load board 400 may include devices under test (DUT) 100a-d and relays 150a-g. The conventional load board 400 may be connected to at least one AWG and at least one DGT. As illustrated, the conventional load board 400 is connected to two AWGs 10a-b and two DGTs 50a-b. As discussed above, the use of multiple converters may increase a rate of transmission of signals. It should be noted that the conventional load board 400 including seven relays 150a-f is only exemplary. Because when the conventional load boards use differential signals, the load board 400 uses fourteen relays.

The AWG 10a may be for an in phase analog signal or a baseband IDAC out. The AWG 10b may be for a quadrature phase analog signal or a baseband QDAC out. The DGT 50a may be for an in phase digital signal or a baseband IADC out. The DGT 50b may be for a quadrature phase digital signal or a baseband QADC out. The DUTs 100a-d may be the devices used for the conversion. Specifically, the DUT 100a may be for a transmitter I signal in while the DUT 100b may be for a transmitter Q signal in. The DUT 100c may be for a receiver I out while the DUT 100d may be for a receiver Q out. Disposed between a path from the DUT 100a to the DUT 100c are the relays 150a-c. Disposed between a path from the DUT 100b to DUT 100d are the relays 150d-f. Furthermore, the relay 150g is disposed between a path from between the relays 150a-c and the relays 150d-f and the AWG 10a. Similar to the conventional load board 400, other baseband devices have multiple I/Q signal pairs. If fourteen relays are required for each I/Q pair, the number of relays becomes very large as does the maintenance of the load board over time. As discussed above, these relays decrease the efficiency and increase the cost and complexity related to calibration of the baseband waveform.

Two independent AWG or DGT used to transmit or receive baseband quadrature I/Q signals have a given relative phase and magnitude inaccuracy between them as they transmit or receive signals through an analog (or digital) path. The extent of these imbalances is frequency and amplitude dependent. The imbalance may be calibrated out by sourcing and measuring signals at the amplitudes and frequencies of interest, measuring these offsets (i.e., calibration factors), and applying them later during production tests.

According to the exemplary embodiments of the present invention, I/Q calibration may be broken into two components. The first component relates to derivation of a tester's magnitude and phase calibration factors. The tester component will be discussed in further detail below with reference to FIGS. 5a-b. The second component relates to application of a load board's magnitude and phase calibration factors. The load board component will be discussed in further detail below with reference to FIG. 6.

Figure 5A:
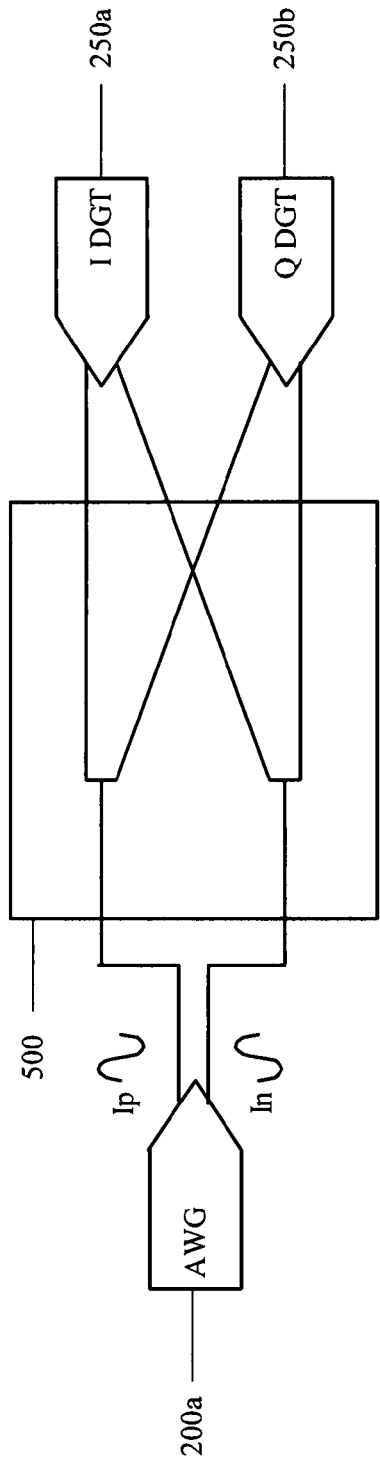
FIG. 5a shows a part of a principle for baseband calibration.
Figure 5B:
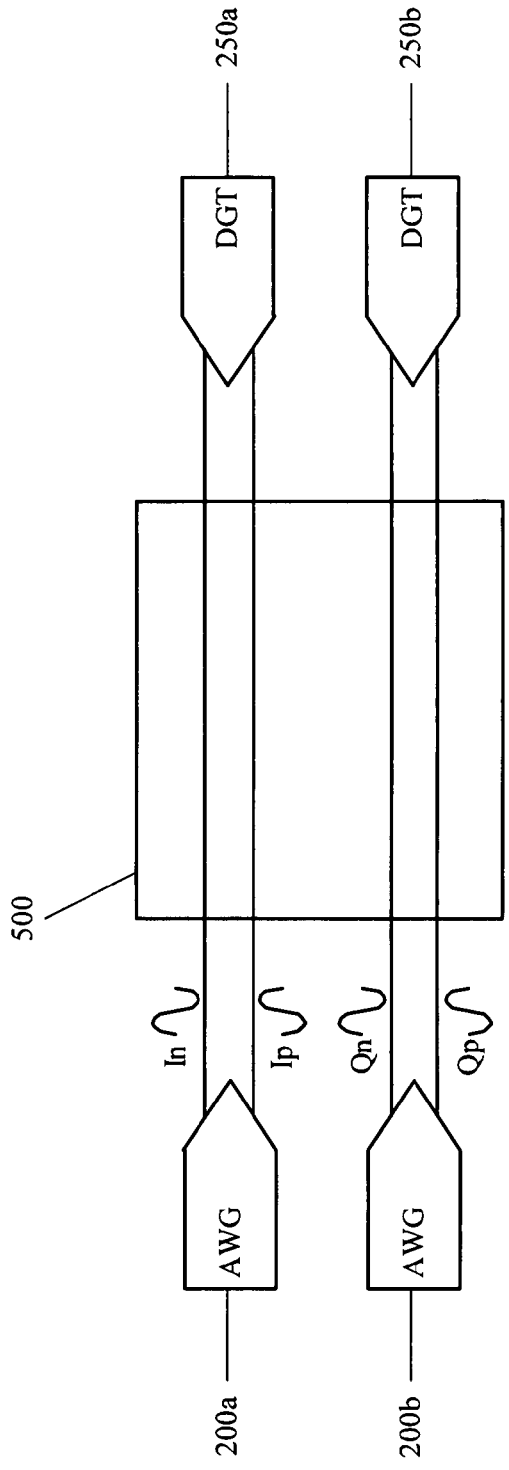

FIG. 5a shows part of a principle for baseband calibration. Specifically, FIG. 5a relates to MCB DGT I/Q calibration where differential outputs of a single AWG are used to calibrate two I and Q DGTs. FIG. 5b shows another part of the principle for the baseband calibration. Specifically, FIG. 5b relates to MCB AWG I/Q calibration where a calibrated DGT is used to calibrate the AWG. In the following description, the process of phase and magnitude calibration as a function of frequency will be referred to as baseband I/Q calibration (hereinafter "BIQC"). BIQC may be simplified if the target AWG and DGT are used to calibrate themselves rather than using external equipment. A load board 500 according to the exemplary embodiments of the present invention may also be used for the calibration. The load board 500 will be described in further detail below with reference to FIG. 6.

The principle involves initially calibrating the DGTs 250a-b using differential signals of a single AWG 200a. Those skilled in the art will understand that it may be assumed that the phase and magnitude difference between the AWG differential outputs is almost zero, as discussed above with reference to FIG. 3 where the initial waveforms 15a-b were substantially identical. Once the DGTs 250a-b have been calibrated relative to each other, the AWGs 200a-b would subsequently be calibrated.

However, because the conventional load board 400 must be used with the relays (e.g., relays 150a-g), implementation of the calibration principle becomes complex as the relays must enable not only the calibration paths but also the paths required to test the DUT (e.g., DUTs 100a-d). Thus, the exemplary embodiments of the present invention further include application of the load board's magnitude and phase calibration factors.

Figure 6:
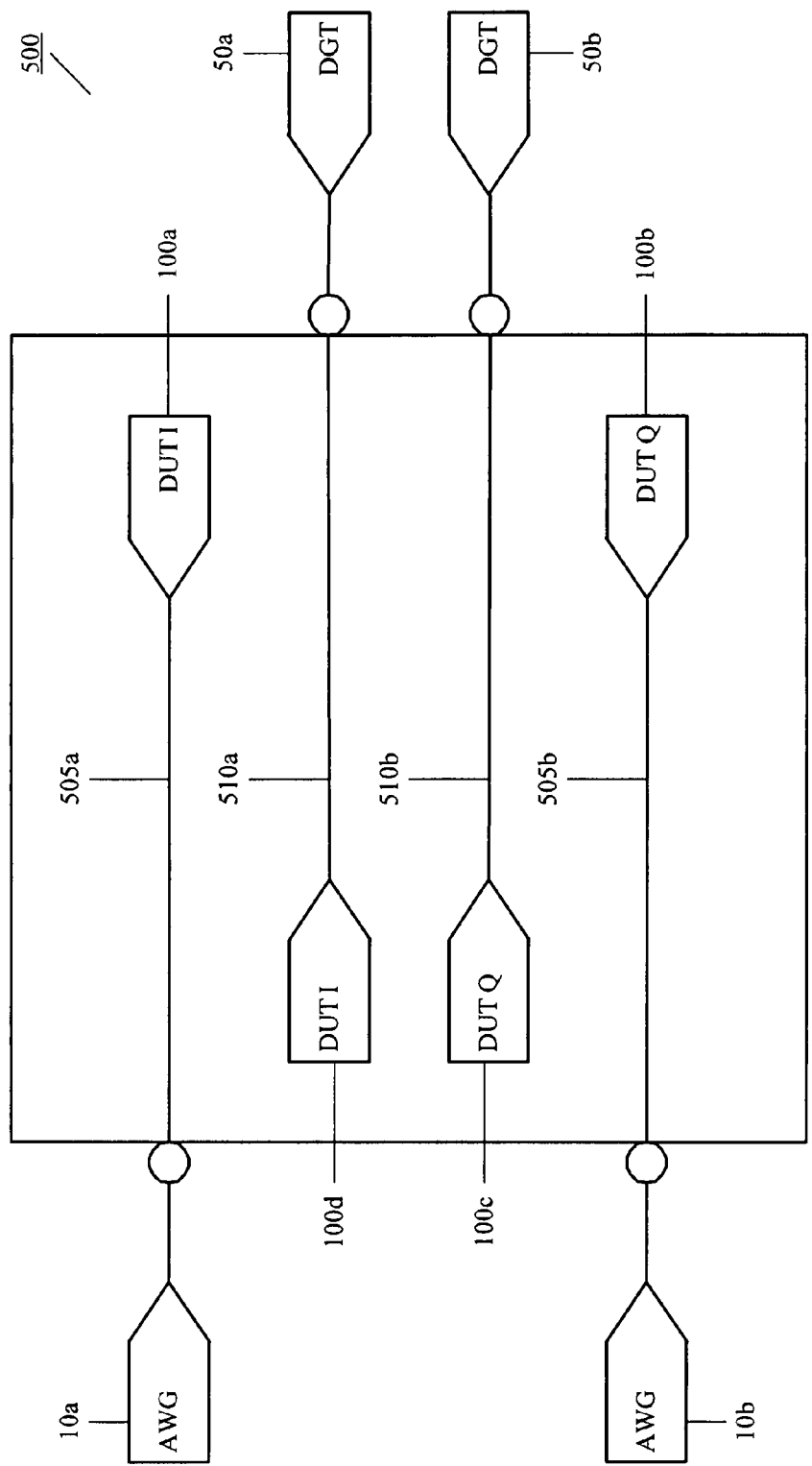
FIG. 6 shows a load board for baseband calibration according to an exemplary embodiment of the present invention.

FIG. 6 shows the load board 500 for baseband calibration according to an exemplary embodiment of the present invention. The load board 500 eliminates the need for the relays 150a-g of the conventional load board 400, thereby significantly decreasing a time to calibrate the conversion. The load board 500 may also be connected to the AWGs 10a-b and the DGTs 50a-b. Furthermore, the load board 500 may also include the DUTs 100a-d. However, the load board 500 includes direct paths 505a-b and direct paths 510a-b. The direct path 505a is between the AWG 10a and the DUT 100a; the direct path 505b is between the AWG 10b and the DUT 100b; the direct path 510a is between the DGT 50a and the DUT 100c; and the direct path 510b is between the DGT 50b and the DUT 100d.

It should be noted that for the exemplary embodiments of the load board 500, the direct path 505a and the direct path 505b have equal path lengths. Furthermore, the direct path 510a and the direct path 510b have equal path lengths. Assuming equal transmission rates, equal paths ensure that the time required for the I or Q signals to pass therethrough are also equal. The equal path lengths may be realized as modern load board manufacturing techniques enable such a design. However, it should be noted that the equal path lengths is only exemplary. In another embodiment, different path lengths may be used, for example, by including in the calibration, the differences in path lengths.

The design of the load board 500 may be realized because the total frequency response of the I/Q path is a result of two contributors (i.e., one inside the tester itself (e.g., AWGs 10a-b or DGTs 50a-b) and one on the load board (e.g., DUTs 100a-d)). If a tester's analog path is calibrated at a test program's set of specific frequencies using a dedicated common load board whose looping paths resemble the load board 500, then base calibration factors may be stored in, for example, a memory of the tester, a controller, etc. Once the path lengths of the direct paths 505a-b and 510a-b are ascertained, magnitude and phase imbalances from the traces on the board may be added to the base calibration factors in the form of time delays (e.g., $\Delta h$) in seconds and attenuation values (e.g., $\Delta a$) in dB.

With basic system calibration of the conventional load board 400, the amplitude and digital timing may have been calibrated at spot frequencies. However, the calibration may not be able to calibrate out certain errors or mismatches. For example, one reason may be that either the absolute or relative phase or magnitude imbalance between two or more AWG or DGT transmission paths through the test head up to a pogo pin of the conventional load board 400. The imbalance is frequency dependent and a function of the active non-linear components (e.g., filters 25a, amplifier chains 25b, load board components 25c, etc.) in the transmission path. Due to the innumerable variables involved, the calibration may be too complex to handle. In another example, another reason may be the load board buffer and/or trace length mismatches. BIQC allows a tester to compensate for these perturbations. In particular, according to the exemplary embodiments of the present invention, these perturbations may be compensated for in a reasonably simple manner on a per frequency basis, thereby improving an overall efficiency of the baseband calibration.

Those skilled in the art will understand that BIQC greatly improves a fidelity of RF and baseband measurements. The exemplary embodiments of the present invention enable a more efficient improvement of the fidelity of the RF and baseband measurements. For example, multi-tone power ratio (MTPR) tests are cumulative inter-modulation distortion (IMD) components of many tones accumulating from energy in a location where a tone should be missing. A small phase imbalance between I and Q signals adds significantly to the IMD component found in the missing tone location. Better phase balance added by performing BIQC reduces an amount of this IMD and decreases the missing tone component of the MTPR.

In another example, an amount of upper or lower RF side band suppression on either side of an RF carrier (e.g., transmission side of an RF transmitter) is a strong function of the balance between the magnitude and phase of a tester's I/Q AWG baseband input pair. Similarly, an ability of a DUT RF receiver to down convert signals is measured by an amount of balance that the I/Q DGTs have. When a tester's I/Q DGTs are not balanced, a device may be perceived as nonconforming to standards when the tester is uncalibrated or out of balance. That is, the device may be conforming but the measurements are not accurate. BIQC may eliminate such scenarios.

In yet another example, error vector measurements (EVM) such as those used in testing 802.11 a/b/g transceivers are highly sensitive to phase and magnitude imbalances. When testing this type of device, it is highly desirable that the tester's AWG/DGT are as balanced as possible. The accuracy of the measurements provided by the BIQC greatly improves the balance thereto.

The baseband calibration of the I/Q signals may be done at various times. Theoretically, all analog instruments have given frequency responses which differ from one unit to another. Variances across identical instruments are usually handled by applying loose enough specifications to handle a Gaussian deviation of performance across all manufactured load boards. A result is a lost opportunity to assess a true accuracy of an individual analog instrument unless BIQC is performed prior to production tests.

System calibration guarantees performance to all analog card specifications. BIQC increases analog card accuracy above that specified for a family. An individual card's frequency responses are revealed and compensated as well as a load board's perturbations introduced by active non-linear components (e.g., buffers) or trace length mismatches. Therefore, BIQC may be done whenever highly balanced I/Q signals are to be sourced or measured by the I/Q AWG or DGT and it is known that such qualities are frequency dependent. Generally, BIQC is performed when baseband or RF measurements are to be made. In practice, due to the method of implementation of BIQC, BIQC may be re-run whenever a program implementing BIQC 1) is run for the first time, 2) is run on a new MCB when an old MCB is replaced, 3) when a new test is added to a program requiring highly balanced I/Q signals and new analog sets are created, 4) when a new pin configuration is used in the program, 5) a new analog setup is used in the program, etc.

It should be noted that it is not required to re-run BIQC for every load board for a given device as BIQC calibrates up to a pogo pin plain. Phase and magnitude offsets of a given load board are added to BIQC calibration factors via a member function of a new API class. The arguments to the API may be required to be modified when 1) a new load board is developed for a same device or its baseband traces have changed or 2) in-line components (e.g., buffers) on the load board are replaced (e.g., due to damage).

Figure 7:
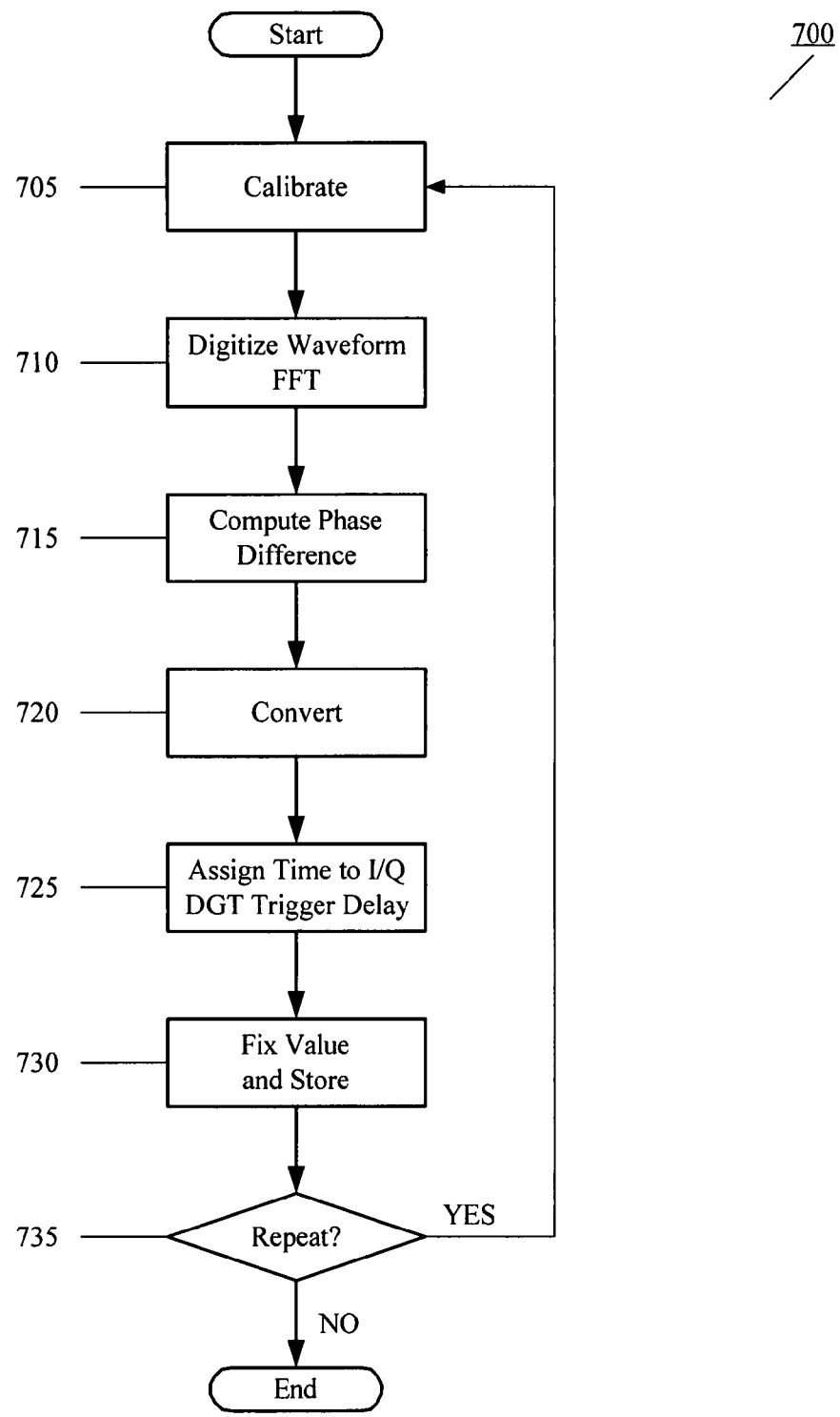
FIG. 7 shows a method for calibrating a baseband according to an exemplary embodiment of the present invention.

FIG. 7 shows a method 700 for calibrating a baseband according to an exemplary embodiment of the present invention. As will be described in detail below, the method 700 may apply to either calibrating for a DGT or an AWG. The calibration for the DGT may refer to the principle described above with reference to FIG. 5a. The calibration for the AWG may refer to the principle described above with reference to FIG. 5b. The method 700 may apply to using the load board 500 described above for the calibration.

In step 705, a calibration is performed. With reference to an MCB DGT I/Q calibration, the DGT (e.g., DGTs 250a-b) is calibrated from the differential output of a single AWG (e.g., AWG 200a). With reference to an MCB AWG I/Q calibration, the calibrated double core DGT (e.g., 250a-b) is used to measure I/Q signals from two separate AWGs (e.g., 200a-b).

In step 710, the waveform is digitized. With reference to the MCB DGT I/Q calibration, the waveforms on the two separate DGT (e.g., DGTs 250a-b) are digitized. With reference to the MCB AWG I/Q calibration, each waveform for each AWG (e.g., AWGs 200a-b) is digitized. In step 710, additionally, a complex Fast Fourier Transform (FFT) is performed on each local digital signal processor (DSP).

In step 715, a phase difference is mathematically computed. With reference to the MCB DGT I/Q calibration, the phase difference may be determined between the DGT through a set of equations:

Phase of $I$ signal=$a \tan 2(I$ Fund. Bin Imaginary, $I$ Fund. Bin Real);

Phase of $Q$ signal=$a \tan 2(Q$ Fund. Bin Imaginary, $Q$ Fund. Bin Real); and

Phase Imbalance (Deg)=180×(Phase of $Q$−Phase of $I$)/$M\_Pi$.

With reference to the MCB AWG I/Q calibration, the phase difference may be determined between the AWG through another set of equations:

Abs. Phase of $I$ signal=$a \tan 2(I$ Fund. Bin Imaginary, $I$ Fund. Bin Real);

Abs. Phase of $Q$ signal=$a \tan 2(Q$ Fund. Bin Imaginary, $Q$ Fund. Bin Real); and Rel. Phase Imbalance (Deg)=180×(Phase of Q−Phase of $I$)/$M\_Pi$.

In step 720, the phase imbalance is converted from degrees to seconds. With reference to the MCB DGT I/Q calibration, the following equation may be used:

Phase Imbalance (Time)=(Phase Imbalance (Deg))/(360×(Fundamental Tone Frequency).

Accordingly, with the MCB AWG I/Q calibration, the relative phase imbalance in degrees may be used.

In step 725, the time is assigned to I or Q trigger delay. For the MCB DGT I/Q calibration, the time is assigned to the DGT trigger delay while the time is assigned to the AWG trigger delay for the MCB AWG I/Q calibration. The determination of which signal is assigned the time depends on the polarity of the imbalance. Thus, when the polarity is positive, the time is assigned to the I trigger delay. When the polarity is negative, the time is assigned to the Q trigger delay.

In step 730, for either the MCB AWG or DGT I/Q calibration, the trigger delay value is fixed. The phase and magnitude calibration factors may also be stored, for example, in an array. In step 735, a determination is made whether to repeat steps 705-730. When further frequencies, filters, gains, etc. are to be used for the calibration, the steps 705-730 may be repeated for each.

Those skilled in the art will understand that the above described exemplary embodiments may be implemented in any number of manners, including, as a separate software module, as a combination of hardware and software, etc. For example, the calibration may be performed using a tester with a program containing lines of code that, when compiled, may be executed on a processor of a computing device.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method for baseband I/Q calibration, comprising:
calibrating signals from one of at least one of a first generator one of receiving and transmitting analog signals and at least two of a second generator one of receiving and transmitting digital signals using a load board including a direct path for each of the analog signals between the at least one of the first generator and a corresponding number of devices under test and for each of the digital signals between the at least two of the second generator and a corresponding number of devices under test;
digitizing one of the analog signals and the digital signals that are in waveform;
determining a phase imbalance to be converted from degrees to a unit of time;
assigning the unit of time to one of an I and Q trigger delay as a function of the polarity of the phase imbalance.

2. The method of claim 1, wherein the first generator is an arbitrary waveform generator.

3. The method of claim 2, wherein the calibrating the signals for the arbitrary waveform generator includes using a calibrated double core analog signal digitizer to measure the I/Q signals from two separate arbitrary waveform generators.

4. The method of claim 1, wherein the second generator is an analog signal digitizer.

5. The method of claim 4, wherein the calibrating the signals for the analog signal digitizer is based on a differential output of a single arbitrary waveform generator.

6. The method of claim 1, wherein the unit of time is assigned to the I signal when the polarity of the phase imbalance is in phase.

7. The method of claim 1, wherein the unit of time is assigned to the Q signal when the polarity of the phase imbalance is quadrature phase.

8. The method of claim 1, further comprising:
repeating the calibrating, the digitizing, the determining, and the assigning for each frequency, filter, and gain to be used.

9. The method of claim 1, wherein the digitizing further comprises performing a complex Fast Fourier Transform for each local digital signal processing.

* * * * *